Aug. 2, 1927.
J. H. HARRIMAN
1,637,524
LOCKING MEANS FOR ROTARY MEMBERS
Filed May 24, 1926
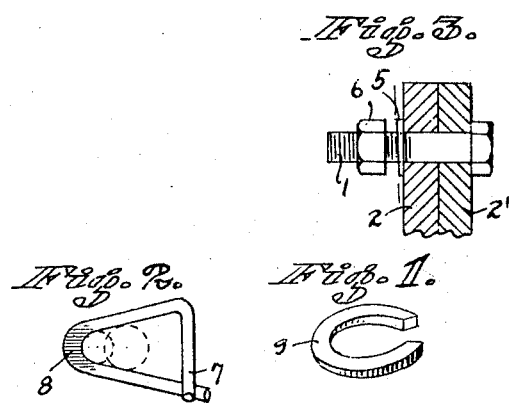
Inventor
James H. Harriman.
Miller & Boyken.
Attorney Patented Aug. 2, 1927.

1,637,524

UNITED STATES PATENT OFFICE.

JAMES H. HARRIMAN, OF SAN FRANCISCO, CALIFORNIA.

LOCKING MEANS FOR ROTARY MEMBERS.

Application filed May 24, 1926. Serial No. 111,174.

This invention relates to means for locking rotary members, particularly threaded rotary members, against adjacent parts in, with or against which, they may be rotatable.

Briefly described, my invention consists in combining an angular surface with rotary devices generally, such as a screw, nut or bolt principally, whereby a longitudinal movement of the device is prevented, tho in its specific construction the invention takes the form of a wedge applied at the juncture of the parts which it is desired to lock.

In the drawings hereto Fig. 1 shows in perspective one form of my invention, Fig. 2 another form in plan, and Fig. 3 is a cross-section of a pair of plates with a bolt extending therethrough with my invention in position on the bolt.

Briefly described the invention comprises a special washer used in connection with a bolt or nut, the washer being of tapered thickness or wedge shape and preferably divided through its thickest portion, and made of spring metal.

In the specific form shown in Fig. 1 the washer is ring shaped with the thinnest portion of its wedge body at the point of the lead from numeral 9 and the washer is thickest at the point of division and preferably offset as shown, tho the washer forms actually in use a plain wedge of substantially unyielding thickness.

In Fig. 2 the wedge shaped washer is thinnest at the point indicated by the numeral 8 and thickest at the numeral 7 where it is divided, tho it is also here shown with parted ends overlapping slightly.

The form shown in Fig. 2, however, is not circular but its contour embraces a bolt space of triangular rounded end form so that it may be placed over various size bolts as per the dotted circles shown within the washer so that the smallest one will fit into the smaller rounded end of the opening.

In either case the wedge is placed over a bolt 1 as shown at 5 in Fig. 3 so that upon screwing down the nut 6 to clamp the plates 2—2' the nut will be tipped by contact with the wedge washer to thereby bend the bolt slightly and thus lock the same against unscrewing.

The wedge being even and unyielding after compression of its offset free ends forms a solid seat for the nut yet the split being at the thickest portion provides sharp edges at the point under greatest compression for impinging the metal of nut and plate or work so that any tendency to unscrew is prevented, yet should any slight unscrewing take place the washer being continuous at the thinnest portion has sufficient spring to follow up the play.

In the case of the design of Fig. 2 an added effect is secured to the others described inasmuch as the overlapping ends will tilt to thereby get a better grip against the opposing metal surfaces between which the washer is clamped.

I claim:

A washer provided with a solid body of gradually tapering thickness and split through its thickest portion, and said washer having an opening therethrough of a substantially triangular form rounded at one of the inner corners of the triangle.

JAMES H. HARRIMAN.